Figures 1, 5:
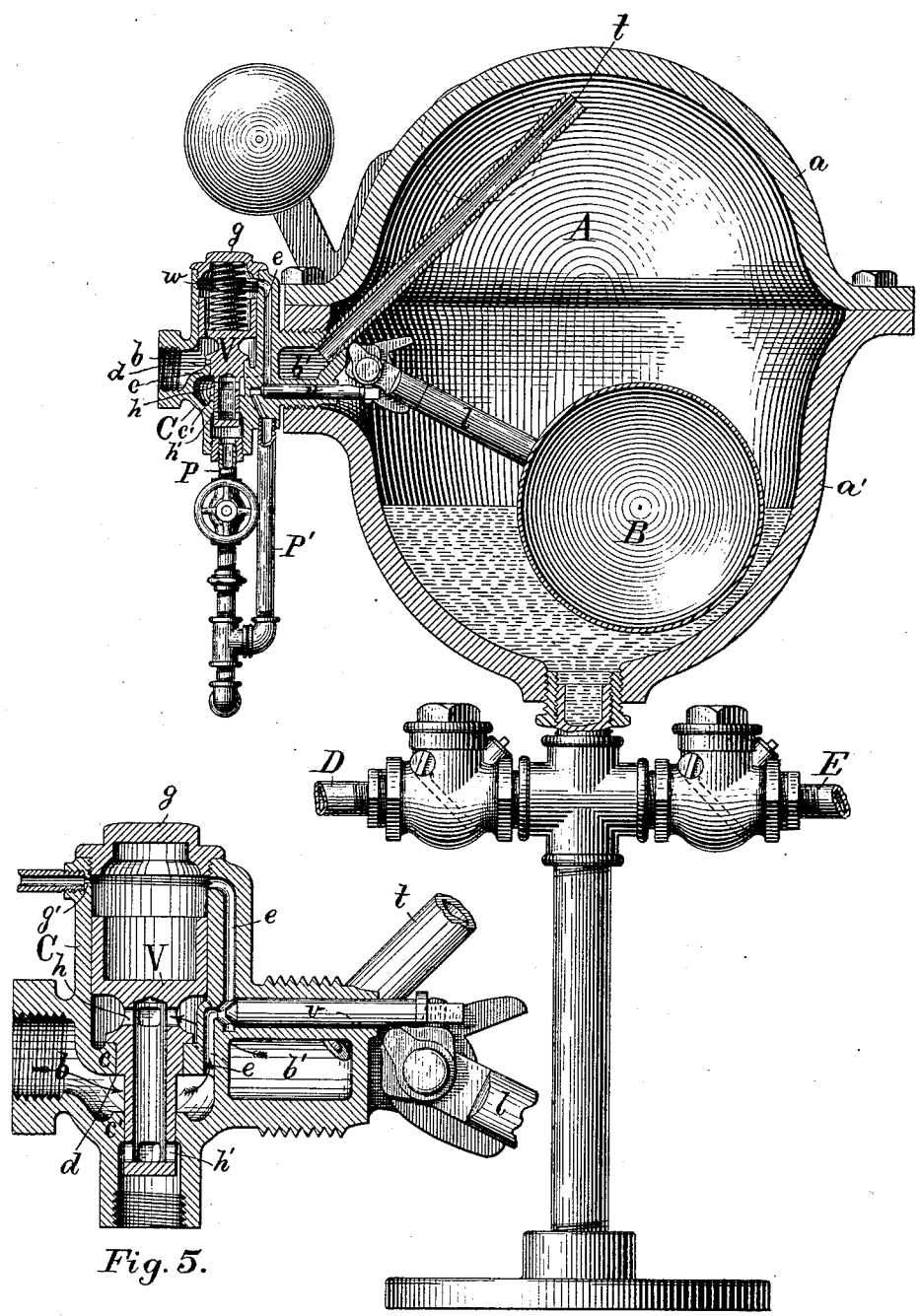

(No Model.) 2 Sheets—Sheet 1.

N. CURTIS.
BOILER FEEDER.

No. 348,892. Patented Sept. 7, 1886.

Witnesses:
Wm. S. Rogers
S. F. Moroney

Inventor:
Nelson Curtis,
by H. W. Swan
Attorney.

(No Model.) 2 Sheets—Sheet 2.

N. CURTIS.
BOILER FEEDER.

No. 348,892. Patented Sept. 7, 1886.

Witnesses:

Inventor:
Nelson Curtis,
by H. W. Swan
Attorney.

UNITED STATES PATENT OFFICE.

NELSON CURTIS, OF BOSTON, MASSACHUSETTS.

BOILER-FEEDER.

SPECIFICATION forming part of Letters Patent No. 348,892, dated September 7, 1886.

Application filed May 13, 1886. Serial No. 202,029. (No model.)

*To all whom it may concern:*

Be it known that I, NELSON CURTIS, of Boston, in the State of Massachusetts, have invented a new and useful Improvement in Boiler-Feeders, of which the following is a specification.

The invention consists in details of construction. It has reference to boiler-feeds or return steam-traps already in use in which the valve controlling the admission of steam to the trap is itself controlled by an auxiliary valve that is easily operated by the depth or weight of the water in the trap.

The object of the invention is to construct a trap that will permit ready access to the interior of the trap without removing any pipe-connection, and also allow access to the principal steam-valve without opening the trap itself. Other advantages gained from the new construction are a provision for the escape of steam from the water-tight chamber after the water has been driven from it, and a provision that the exhaust for the escape of steam to destroy the equilibrium of pressure above and below the piston of the main valve opens into the open air, instead of into the steam-tight water-chamber into which it is desired to admit steam through the main valve-port. There is consequently no back-pressure upon the piston of the main valve.

The trap which I have constructed according to the present invention does not differ in its mode of operation, except in the particulars above mentioned, from the boiler-feed described and shown in my Patent No. 231,543, dated August 24, 1880. Like the trap of that patent, it is designed to be placed between the source of water-supply and the boiler, and, as in the old form of construction there is a steam-tight water-chamber provided with water-passage-ways adapted to communicate, respectively, with a condenser or other source of supply and the boiler, each of said passage-ways having its appropriate check-valve. As in the old form of construction, also, there is a passage-way designed to communicate directly with the steam-drum of the boiler, in which passage-way is placed a differential piston-valve, the piston of which fits loosely in a chamber or branch passage-way opening out of said main passage-way; and this branch passage-way above the piston is narrowed to a small passage-way forming an escape that is controlled by an auxiliary or relief valve that in turn is controlled by the position of a float in the above-mentioned steam-tight water-chamber. When the float is down, the relief-valve is closed and there is an equilibrium of steam-pressure above and below the piston of the main valve, causing that valve to remain closed, since the lower surface of the piston exposed to steam-pressure is not equal to the upper surface so exposed. When the float is up, the relief-passage is open, and, there being no pressure above the piston, the main valve opens and lets steam into the water-chamber to act upon the surface of the water therein.

Figure 2:
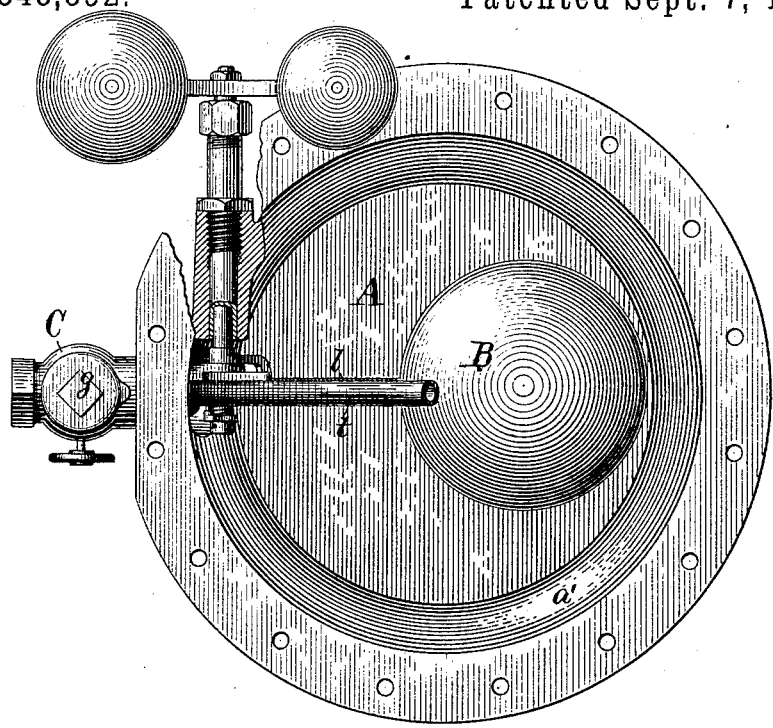
Figure 3:
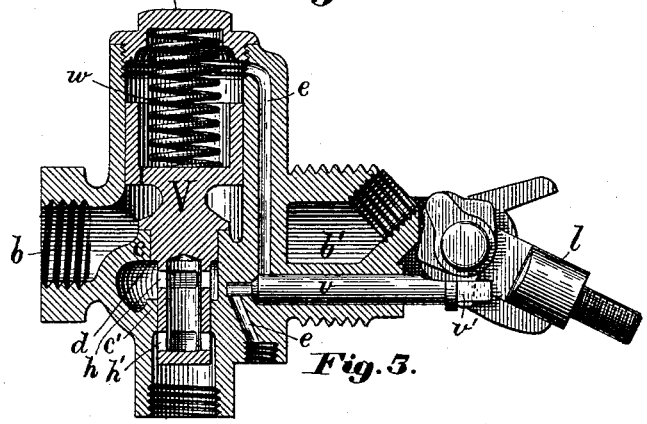
Figure 4:
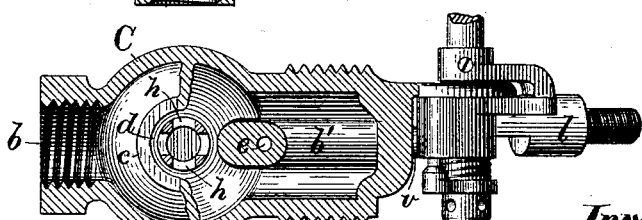

In the drawings, Figure 1 is a vertical elevation, mostly sectional, of a return-trap embodying my said invention. Fig. 2 is a plan of the casting forming the lower part of the steam-chamber of the trap, with attachments. Fig. 3 is a vertical sectional elevation of the valve-casing, including the valves and valve mechanism. Fig. 4 is a horizontal sectional elevation of the same.

A is the trap proper, being a steam-chamber formed of two cups or hollow hemispheres, $a$ $a'$, bolted together, as shown.

B is the float.

C is the valve-casing containing the several valves and the valve mechanism, with the exception of the float and a lever connecting the float with the auxiliary valve. The valve-casing has a hollow arm, $b$, that opens from the interior of the valve-casing above a partition, $c$, therein, containing a port, $d$, and forming a seat for the main valve V, which, as shown, is a differential piston-valve. The hollow arm $b$ is threaded to receive a pipe connecting with the boiler. A second hollow arm, $b'$, furnishes a passage from the interior of the valve-casing C below the partition $c$ and port $d$ to the interior of the trap or chamber A. The piston-valve V has a stem passing through a hole in a second partition, $c'$, of considerable thickness, in the interior of the valve-casing C, as shown, and this stem is in part hollow, to afford communication between two ports, $h$ and $h'$, the former of which at all times opens into the interior of the valve-casing C between the partitions $c$ and $c'$, while the latter, $h'$, opens into the interior of the valve-casing C below the the partition $c'$ only when the valve V is on its seat, and is closed by the partition $c'$ when the valve V is raised from its seat. The port $d$ is thus the inlet steam-port, and the port $h'$ the exhaust-steam port, of the chamber or trap A. The upper end of the valve-casing C is closed by a screw-plug, $g$, as shown. The lower end is threaded to receive a relief-pipe, P, for exhaust-steam escaping through port $h'$. One side of the valve-casing C is thicker than the other, and contains a small passage-way, $e$, opening at one end into the interior of the valve-casing C above the piston of the piston-valve V, while its lower end is threaded to receive a relief-pipe, P', for the escape of steam from above the piston. The hollow arm $b'$ is cut thick enough at one side to contain a hole, in which fits, as shown, the sliding valve $v$, this being the auxiliary valve mentioned above. One end of it is connected by a bell-crank lever, $l$, having a friction-pivot, with the float B, and the other, according to its position as determined by the float, opens or closes the small passage-way $e$. The piston of the piston-valve V is of larger area than the valve proper or the part closing the port $d$, and somewhat loosely fits the interior of the casing.

D is the inlet-water-supply pipe, threaded to connect with the heaters or other source of supply, and E is the outlet water-pipe, threaded to connect with the boiler. These pipes D and E are provided with the requisite check-valves, as shown. A pipe, $t$, screwing into the hollow arm $b'$, directs steam entering through that arm to the top of the chamber A, in order that the steam may enter above the water in chamber A, whatever may be the depth of the water in the chamber; but it is obvious that the apparatus will work without the employment of said pipe $t$. A spring, $w$, helps the differential piston-valve to return to its seat, and also serves to prevent the piston of said valve from shutting off the passage of steam through $e'$. There are thus two paths that steam entering the valve-casing through the hollow arm $b$ may travel—viz., first, a main path, if valve V be open, through port $d$, arm $b'$, and pipe $t$, to the interior of the trap A; and, second, a branch path up by the piston-valve into passage $e$, and, when the auxiliary or relief valve $v$ is open, on through relief-pipe P' to the open air. The water-outlet pipe E may, perhaps, be regarded as a continuation of the main path for steam entering the trap when the valve V is open, but when the valve V is closed, the outlet for steam that has entered by the trap through port $d$, arm $b'$, and pipe $t$ is back through pipe $t$, arm $b'$, port $h$, interior of valve-stem, port $h'$, and relief-pipe P.

At Fig. 5 is shown a modification of the valve mechanism of the lower chamber. The hollow arm $b$ communicates with the interior of the casing below the partition $c$ to the interior above the piston of the piston-valve V. The valve $v$ works across the passage $e$, as before, but the float is so pivoted thereto as to open the passage in falling and to close it in rising. A pin-hole passage, $g'$, is made through the shell of the casing above the piston of the piston-valve. The port $h$ in the valve-stem is above partition $c$.

Further description of the mode of operation is unnecessary. It may be well to state, however, that the invention is applicable to any trap in which the quantity or weight of the water within the trap may be made to determine the position of the auxiliary valve controlling the main valve of the steam-inlet to the trap.

I claim—

The combination, with steam-tight water-chamber A, provided with float B, of inlet and outlet passage-ways D and E, the valve-casing C, containing a main and a branch steam passage-way, with main valve V and auxiliary valve $v$ therein, and an outlet steam passage-way with valve $h'$ therein, and a lever-connection between said auxiliary valve $v$ and said float, substantially as described.

NELSON CURTIS.

Witnesses:
W. W. SWAN,
WM. S. ROGERS.